Figure 2:
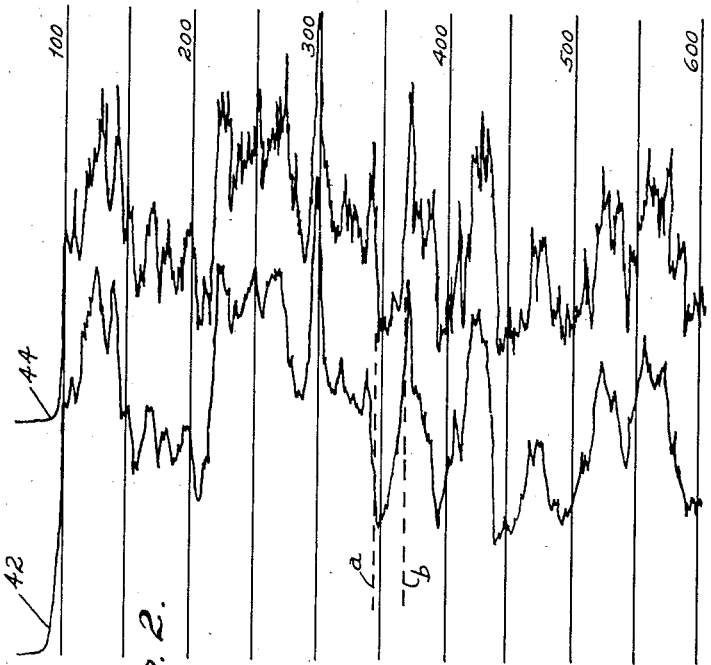

Jan. 11, 1949.　　　　　G. HERZOG　　　　　2,458,596
RADIOACTIVITY WELL LOGGING METHOD
Filed Dec. 10, 1946

INVENTOR.
GERHARD HERZOG
BY
Daniel Stryker
ATTORNEY

Patented Jan. 11, 1949

2,458,596

UNITED STATES PATENT OFFICE 2,458,596

RADIOACTIVITY WELL LOGGING METHOD

Gerhard Herzog, Houston, Tex., assignor to The Texas Company, New York, N. Y., a corporation of Delaware Application December 10, 1946, Serial No. 715,204

6 Claims. (Cl. 250—83.6)

This invention relates to the radioactivity logging of bore holes or wells, more particularly to the method in which the natural radioactivity, i. e., gamma radiation of the formations traversed by a bore hole is measured or logged. The principal object of the invention is the provision of a method and apparatus by means of which with one passage of the logging instrument through the hole two separate logs may be obtained, one showing generally the intensities of the radiation from the formations and the other showing more sharply the breaks or interfaces between adjacent formations and also the intensity of radiation from thin formations at substantially its full value.

In the conventional gamma ray logging of a bore hole a gamma ray detector is passed through the hole and its output is recorded as a curve showing the intensities of the radiation entering the hole from the surrounding formations. If the detector is of the current pulse producing type the amplified pulses are integrated and then recorded as a continuous curve. If the time constant of the integration circuit is relatively long a comparatively smooth curve will result due to more complete averaging of the statistical fluctuations. The transition from one intensity value to another is necessarily broadened; changes on the log occur slowly and there may be such a lag that the detector may traverse several feet in the hole before the full value is indicated in the log. If a thin formation is traversed the true value of the intensity may never be reached since sharp peaks or lows are not recorded with their full amplitude. On the other hand, if the integration circuit has a relatively short time constant, changes on the log appear in a shorter time, that is the breaks on the log appear to be much more abrupt. At the same time thin formations are recorded with substantially their full intensity values. The disadvantage of this log made with an integration circuit of short time constant is that the statitstical fluctuations appearing on the log are much more pronounced and are frequently difficult to distinguish from the radiation it is desired to record. In accordance with the present invention the advantages of both types of log are obtained by simultaneously integrating the pulses from the detector in two integration circuits one having a relatively short and the other a relatively long time constant. Two separate logs are thereby produced. One of these logs will, as stated above, indicate generally and smoothly the radiation intensities from the traversed formations while the other will indicate more sharply and abruptly sudden changes in intensity.

Figure 1:
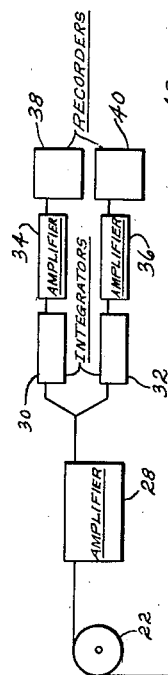
Figure 1:
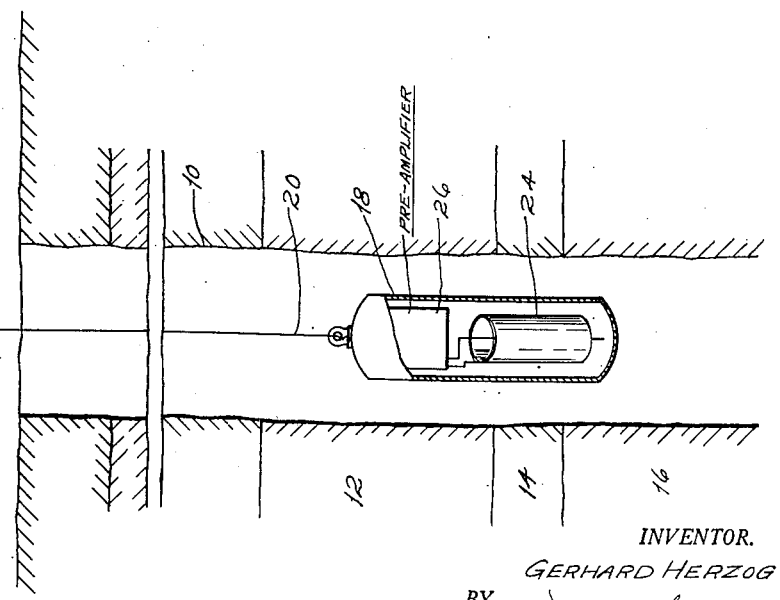

For a better understanding of the invention reference may be had to the accompanying drawing in which:

Figure 1 is a somewhat diagrammatic sectional elevation through a logging instrument in a bore hole and Figure 2 is a curve or rather a pair of actual curves made simultaneously by using two integration circuits having different time constants.

Referring to the drawing a bore hole 10 is shown as traversing several subsurface formations such as 12, 14 and 16. Within the bore hole is shown a logging instrument or probe having a housing 18 suspended by means of a cable 20 so that it can be lowered and raised in the hole. The cable 20 passes over a measuring wheel 22 by means of which the depth of the instrument in the hole can be recorded and correlated with the record obtained from the logging instrument.

Within the housing 18 is a radiation detector 24 shown as of the current pulse producing or countertype having a cylindrical cathode and a longitudinally disposed wire anode within a gaseous atmosphere. Pulses produced by the detector due to the intercepted gamma radiation from the surrounding formations are preferably preamplified by means of the device 26 and are then conducted upwardly to the surface over the cable 20 in any suitable manner. At the surface the preamplified pulses are again amplified at 28 and the amplified pulses are then passed to two integrators or integration circuits shown diagrammatically at 30 and 32. These integration circuits have different time constants and as an example, the time constant of the circuit 30 may be 3 seconds while that of circuit 32 may be of the order of ¼ second. Generally it will be satisfactory when the time constant of the circuit 30 is from 5 to 15 times as long as the time constant of the circuit 32. The integration voltages are then passed through a pair of amplifiers 34 and 36 to a pair of recorders 38 and 40 which may be in the form of recording galvanometers.

In operation, as the logging instrument is passed through the bore hole the recorder 38 will produce a curve of the general nature of that shown by the curve 42 of Figure 2 and it will be observed that this curve is fairly smooth and provides a general picture of the intensities of the formations surrounding the bore holes. Simultaneously therewith the recorder 40 will produce a curve such as that shown at 44 in Figure 2, this curve having considerably sharper breaks wherever changes in the formations occur. Due to the short time constant curve 44 will show larger statistical fluctuations than will curve 42. Curve 44 is of particular value in locating more exactly the interfaces between adjacent formations and also in indicating the intensities of thin formations such as 14 of Figure 1 at their full value. As an example of the difference in these curves reference is directed to the portions between the dotted lines $a$ and $b$. In this area curve 42 comes more or less gradually to a point whereas the portion of curve 44 between the dotted lines indicates a wide, fairly flat trough.

Obviously many modifications and variations of the invention, as hereinbefore set forth, may be made without departing from the spirit and scope thereof, but only such limitations should be imposed as are indicated in the appended claims.

I claim:

1. In radioactivity bore hole logging in which a detector of penetrative radiation is passed through a hole traversing subsurface formations, the method of smoothing out statistical fluctuations while recording the radioactivity from the formations at its true value which comprises simultaneously integrating the pulses from said detector in two integrating circuits one having a short and the other a long time constant, and separately recording the outputs of said two integrating circuits.

2. In radioactivity bore hole logging in which a detector of penetrative radiation is passed through a hole traversing subsurface formations, the method of smoothing out statistical fluctuations while also recording the radioactivity from the formations at its full value which comprises conducting the detector pulses to the surface, amplifying the pulses arriving at the surface, integrating the amplified pulses simultaneously in two integrating circuits one of said integrating circuits having a time constant several times as long as the other integrating circuit and simultaneously recording the outputs of said two integrating circuits so as to obtain two separate logs, the log from the integration circuit of longer time constant providing a relatively smooth curve and the log from the integration circuit of shorter time constant providing a relatively sharp curve showing the detected radioactivity at substantially its full value.

3. In radioactivity bore hole logging in which a detector of penetrative radiation is passed through a hole traversing subsurface formations, the method of smoothing out statistical fluctuations while also recording the radioactivity from the formations at its full value which comprises preamplifying the pulses from the detector, conducting the preamplified pulses to the surface, amplifying the pulses arriving at the surface, integrating the amplified pulses simultaneously in two integrating circuits one having a relatively short and the other a relatively long time constant and separately recording the outputs of said two integrating circuits so as to obtain two logs, the log from the integration circuit of longer time constant providing a relatively smooth curve due to better averaging of the statistical fluctuations and the log from the integration circuit of shorter time constant providing a relatively sharp curve showing the detected radioactivity at substantially its full value.

4. An apparatus for logging the formations traversed by a bore hole which comprises a radiation detector, a cable for lowering said detector through said hole, and for conducting pulses from the detector to the surface, two integrating circuits at the surface connected to receive the output of said detector, one of said integrating circuits having a relatively short and the other a relatively long time constant, and means for simultaneously recording the outputs of said integration circuits.

5. An apparatus for logging the formations traversed by a bore hole which comprises a radiation detector, a cable for lowering and raising said detector through said hole and for conducting pulses from the detector to the surface, means at the surface for amplifying the pulses, two integrating circuits connected to receive the output of said amplifying means, one of said integrating circuits having a time constant several times as long as the other integrating circuit, and means for simultaneously and separately recording the ouputs of said integration circuits.

6. An apparatus for logging the formations traversed by a bore hole which comprises a housing, a cable for lowering and raising said housing through said hole, a radiation detector of the current pulse producing type in said housing, a preamplifier in said housing for amplifying the pulses from said detector, means associated with said cable for conducting the preamplified pulses to the surface, means at the surface for amplifying the pulses, two integrating circuits connected to receive the output of said amplifying means, one of said integrating circuits having a time constant from 5 to 15 times as long as the other integrating circuit, and means for simultaneously and separately recording the outputs of said integration circuits.

GERHARD HERZOG.

No references cited.